United States Patent [19]

Salihi

[11] Patent Number: 4,533,862
[45] Date of Patent: Aug. 6, 1985

[54] POLYPHASE MOTOR DRIVE IMBALANCE DETECTION

[75] Inventor: Jalal T. Salihi, Manchester, Conn.

[73] Assignee: Otis Elevator Company, Farmington, Conn.

[21] Appl. No.: 678,361

[22] Filed: Dec. 4, 1984

Related U.S. Application Data

[63] Continuation of Ser. No. 434,012, Oct. 12, 1982, abandoned.

[51] Int. Cl.³ ............................................. H02P 5/40
[52] U.S. Cl. ................... 318/798; 187/29 R; 318/806
[58] Field of Search ................... 318/806, 798; 361/31, 361/76, 77, 87; 187/29 R

[56] References Cited

U.S. PATENT DOCUMENTS

| | | | |
|---|---|---|---|
| 3,225,256 | 12/1965 | Carter et al. | 361/76 |
| 3,961,688 | 6/1976 | Maynard | 187/29 R |
| 4,007,401 | 2/1977 | Kimmel et al. | 361/31 |
| 4,024,439 | 5/1977 | McClain et al. | 361/31 |
| 4,057,842 | 11/1977 | Bauman et al. | 361/31 |
| 4,101,013 | 7/1978 | Duriez et al. | 318/779 |
| 4,286,303 | 8/1981 | Genheimer et al. | 318/798 |
| 4,333,119 | 6/1982 | Schoenmeyr | 361/76 |
| 4,351,012 | 9/1982 | Elms et al. | 361/97 |

Primary Examiner—David Smith, Jr.
Attorney, Agent, or Firm—Robert E. Greenstien

[57] ABSTRACT

The current in the windings of a polyphase motor are individually sensed, and individual signals that indicate that current are provided. Using these signals, the difference between positive and negative current flow through the motor is determined, and if that difference exceeds a first level, for a preset duration of time, the motor is permitted to operate for a limited time. But, if it exceeds a second level, for a preset duration of time, the motor is slowed down in a programmed manner. Total current flow through the motor is determined from these signals as well, and if it exceeds a maximum for a preset duration of time, the motor is stopped in a programmed manner.

2 Claims, 3 Drawing Figures

POLYPHASE MOTOR DRIVE IMBALANCE DETECTION

This is a continuation of Ser. No. 434,012, filed Oct. 12, 1982, now abandoned.

DESCRIPTION

1. Technical Field

This invention relates to polyphase motors, and, in particular, detection of drive imbalances in polyphase motors.

2. Background Art

A polyphase motor has a number of windings and, in the usual application, these windings carry current from a multiphase power supply that powers the motor. The motor can be powered by an inverter supplied by a D.C. source to provide multiphase voltage or current to the motor.

Polyphase motors are widely used, and an elevator is but one application. But, by comparison to other applications, motor performance must be superior in an elevator to have a smooth, quiet and precise drive.

Imbalanced motor winding current can deteriorate motor performance. If small, the effect may be just a rough ride. A defective inverter output transistor or broken winding, on the other hand, can cause a severe imbalance, and the motor may not operate or may be on the verge of complete failure. In short, depending on the severity of the imbalance, elevator performance can range from an uncomfortable, noisy ride to outright drive failure.

DISCLOSURE OF INVENTION

An object of the present invention is to detect different imbalances in a polyphase motor drive, determine what those imbalances indicate, and control the motor accordingly.

According to the invention, tests are performed on the motor current supplied to each winding. These tests include measuring the AC current differences between the various windings to detect low level vibration-like aberration in motor operation, which can cause rough, but acceptable operation. Another test involves determining if there is current imbalance between any of the windings that exceeds a level at which damage may be eminent. According to another test, the total power flow to the motor, as manifested by the current in the motor, is monitored to detect whether the current exceeds a safe limit.

The tests reveal different motor operating characteristics at any instant in time, and by correlating the results, a certain fault in the motor drive is determined, and motor operation is altered as required.

For instance, in the case of an elevator system if the vibration test is the only one that is positive, the elevator ride may be poor, the motor can continue to operate. In that case, the car can be brought normally to the next floor, or to a scheduled floor, and parked there until maintenance can be performed. But, if the test for greater imbalance between the windings is also positive, a far more critical problem exists, perhaps requiring bringing the car to an emergency stop or to the very next floor. If, in addition, the test for a drive or winding failure is positive, the car may be brought to an emergency stop.

The invention thereby provides motor performance monitoring that uses the current to the motor to determine critical motor performance characteristics. A feature is that it can be used to control elevator car positioning to provide safe, reliable performance based on the results of the test monitoring and testing.

BEST MODE FOR CARRYING OUT THE INVENTION

Figure 1:
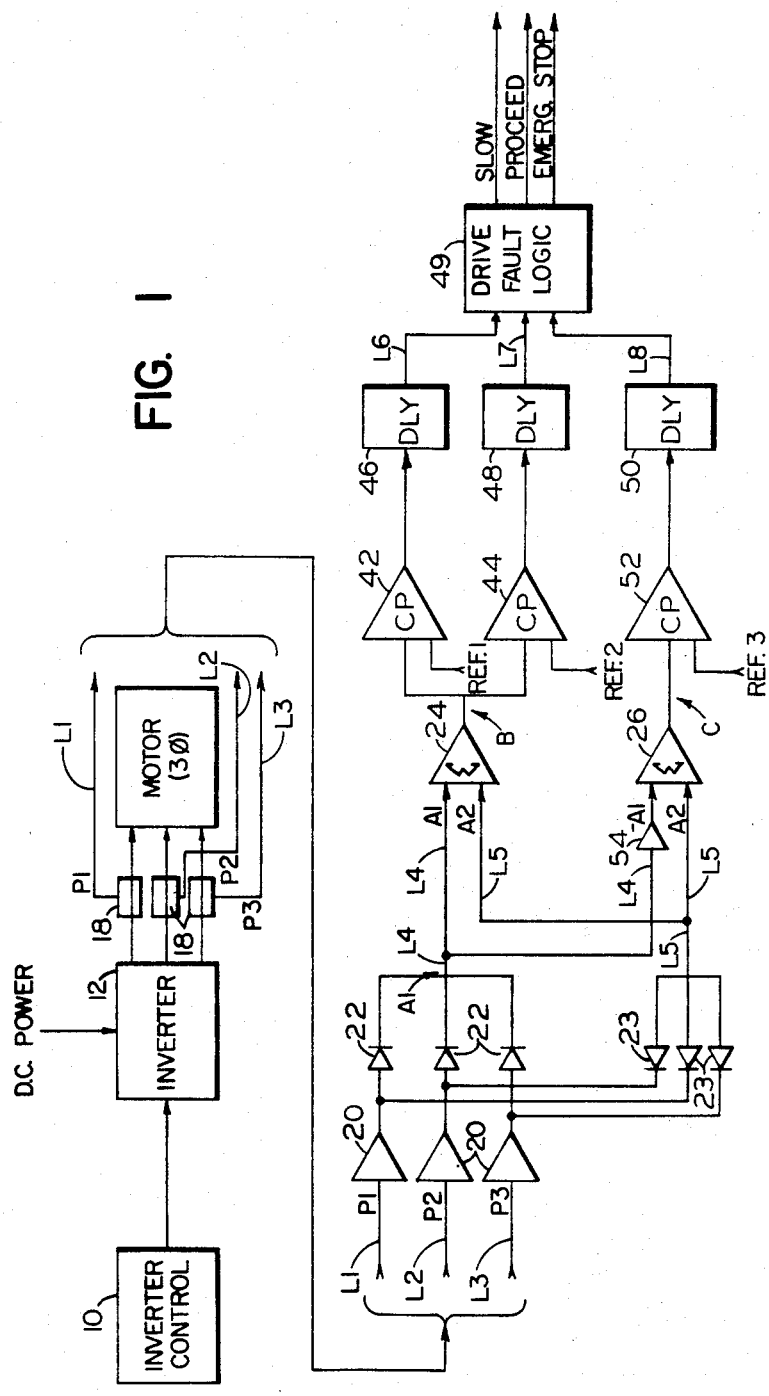
FIG. 1 is a block diagram of a drive system embodying the present invention.

Referring to FIG. 1, an inverter control 10, which is well known in the art, provides control signals to an inverter 12, which is also well known in the art. This inverter receives power from a D.C. source, such as a battery or a D.C. power supply, and provides current or voltage from this source to a polyphase motor 14, in this case having three phase windings, 120° apart in phase, each supplied from a corresponding line 16 from the inverter. The inverter, in response to the output signals from the inverter control, controls the magnitude of the voltage or current to the motor, and this varies the motor's operating characteristics, e.g. speed and torque. An inverter is one way to provide multiphase power to the motor. Also, a motor control such as this, using an inverter, an inverter control with a polyphase motor, is well known in the art.

Figure 2:
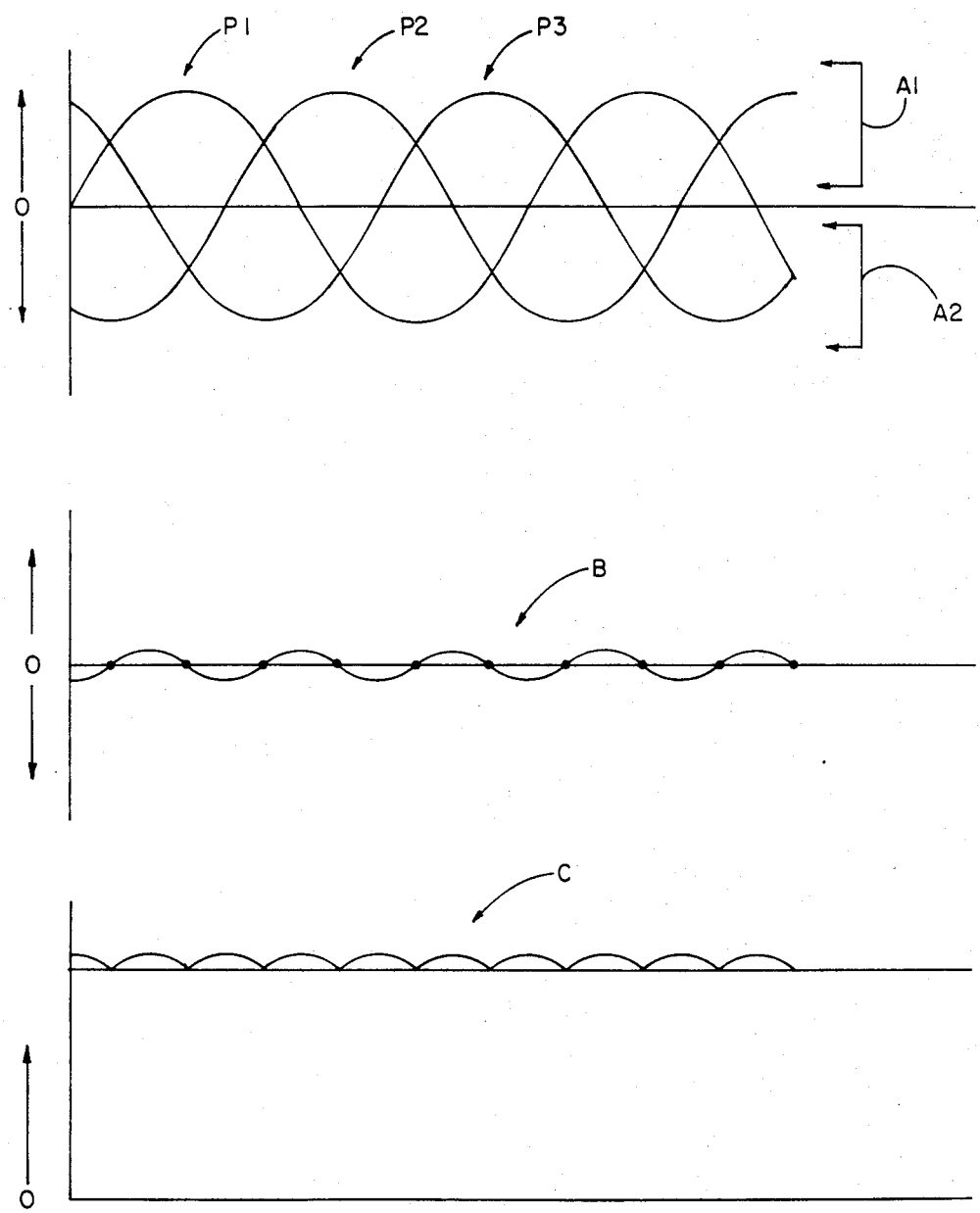
FIG. 2 comprises several signal waveforms, on a common time base, representing signals provided at different points in the drive system in FIG. 1.

The current which flows from the inverter to the motor passes through a current sensor 18, such as a hall detector, which provides an A.C. signal whose characteristics represent the current's magnitude and frequency. Thus, the three lines L1, L2 and L3 each provide phased signals, the signals P1, P2, P3 in FIG. 2, representing the current characteristics in the three different phase windings.

These A.C. signals on the lines L1, L2 and L3 are provided to buffer amplifiers 20, and the outputs from these amplifiers are supplied to a first set of rectifying diodes 22. The cathodes of these are connected to the outputs of the amplifiers, and the anodes are connected to the line L4 which supplies input amplifiers 24 and 26. The diodes 22 rectify the outputs from the amplifiers 20 to produce a composite signal on the line L4. That signal, the signal A1 in FIG. 2, comprises the sum of the positive portions (within the bracket) of the signals P1, P2, P3. The signal A1 is supplied on the line L4 to one input of the summing amplifier 24, and the other input, on line L5, is supplied from another set of diodes 23. But their cathodes are connected to the outputs of the amplifiers 20 (the reverse of the diodes 22), and, hence, the diodes produce a composite signal, the signal A2, on the line L5, which is the sum of the negative portions (between the brackets) of signals P1, P2, P3. The diodes 22 and 23 provide, in this way, halfwave rectification of the P1, P2, P3 signals from the hall detectors that represent the winding current characteristics, each thereby reflecting positive and negative current flow between the inverter and the motor.

The signal A1 on the line L4 is also supplied to an inverter circuit 28, which provides an input to a summing amplifier 26. The other input receives the signal A2 on the line L5. The amplifier 24 adds the signals A1 and A2. If they are equal (positive and negative currents are equal), there is almost complete cancellation and the signal B in FIG. 2 is zero, except for a small amount of ripple, which indicates some unavoidable current differences. The signal B is supplied to two comparators 42 and 44. At the comparator 42 the signal B is compared to a first reference signal, Ref 1, and if its magnitude exceeds the reference signal, the comparator's output changes state. At the comparator 44 the signal B is compared to a second, greater reference signal, Ref 2, and if the signal B exceeds this reference, comparator 44 changes state. Thus, two different current imbalance levels are sensed. Each of the comparators 42, 44 is connected to a delay circuit 46, 48, which changes state in response to the comparator output if it is present after a delay, thus delaying transmission of the comparator signal, in effect. The principal reason for this "delayed gating" is to generate an output signal, which is high or low, only if the comparator output it receives is high for a fixed duration of time. This is done to filter spurious comparator signals, e.g. from noise. The outputs from the delay circuits are supplied to a logic unit 49 over the lines L6 and L7, and that unit uses the signal status on those lines, at any instant in time, in order to provide motor control signals that are used to stop the motor, slow the motor, or continue motor operation, depending upon the state of the lines L6, L7 and L8.

The logic unit also receives the output from another delay 50 on the line L8. This delay is connected to the output from a third comparator 52, which receives the output from the summing amplifier 26. This amplifier receives the signal A2 and the output from an inverter 28, the inverse of the signal A1 that is the input to the inverter. The output from the amplifier 26 is the signal C in FIG. 2, which is the summation of the signal A2 and the inverse of the signal A1. If the signal C exceeds the reference signal, Ref 3 (or a programmed current amplitude signal that represents the current command), the comparator 52 changes state. The signal C has an instaneous level which shifts up and down, depending upon the peak current in the motor winding (represented by the peaks of the signals A1 and A2), and this provides an indication of the instantaneous motor. The reference signal, Ref 3, supplied to the comparator 32, is set so that when the level of the signal C exceeds a level at which there is too much current, the comparator 32 fires. The delay is set to discriminate against high level noise and transients, thus providing noise immunity.

Figure 3:
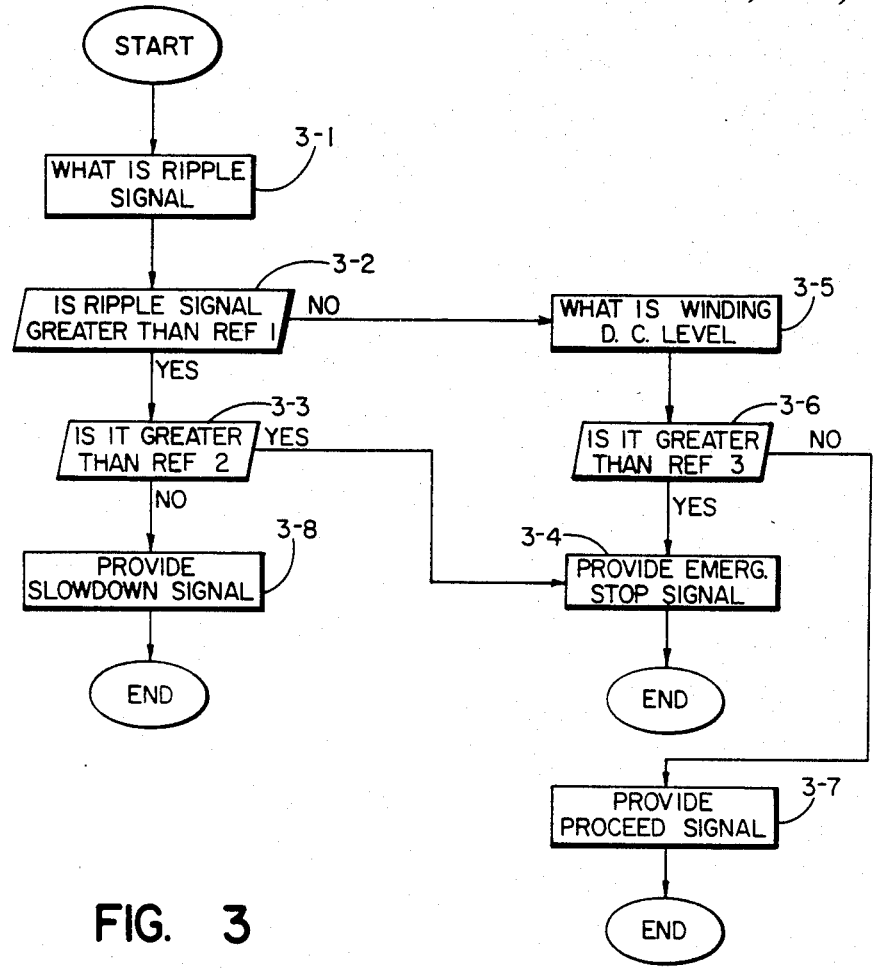
FIG. 3 is a flow chart showing the test routine, according to the present invention, carried out by the system in FIG. 1.

The logic unit uses the state of the lines L6-L8 to control motor operation, and it does that as part of a test scheme which tests for various types of current imbalances and levels using the current sensing that has been described. The test routine starts at step 3-1 in FIG. 3, where the low level ripple is sensed (the signal B is produced). In step 3-2, it is determined if the ripple level is greater than a limit (Ref 1). If this test is positive, at step 3-3, it is determined if the ripple level is greater than a higher limit (Ref 2). If this test is positive, at step 3-4, the motor is brought to an emergency stop. In an elevator, the car is brought to a complete stop in a programmed manner. After that step 3-4, the test routine would then end.

If, however, the ripple was not found to exceed Ref 1, in 3-2, the test would still proceed, but to step 3-5, which senses the current level (the signal C is produced). At step 3-6 it is determined if the level is greater than a limit (Ref 3). If the result is positive, step 3-4 is initiated to bring the motor to a stop. But, if it is negative, a "proceed" signal is provided at 3-7, and then the routine ends, as no imbalances or excesses have been found yet.

So far, two conditions have been checked. There is a third. If at step 3-3 the peak ripple level was not greater than Ref 2, the test would have produced a negative answer. In that case the test, rather than proceeding to step 3-4, an emergency motor stop, would proceed to step 3-8, which would cause the system to stop at the next available location—in an elevator system, at the next floor. The reason is that step 3-8 is needed when there is a minor imbalance. The motor need not be stopped, however, because the condition represents a poor motor operation, not a major problem. That is, the danger of a complete motor failure is remote; the system most likely requires minor adjustment or maintenance.

Based on previous discussions and explanations, one skilled in the art may, without departing from the invention's spirit and scope, make modifications and variations in these embodiments. For example, computer-based apparatus may be used in various portions of the test routine; discrete logic circuits may be used, as well, for instance as the logic unit.

I claim:

1. Apparatus comprising:
   a polyphase motor for propelling an object;
   a motor control and power supply for controlling and powering the motor;
   characterized in that the motor control comprises:
   means for operating the motor at a first speed;
   hall detector means comprising individual hall detectors associated with each motor winding for providing an output signal associated with each motor winding that manifests current magnitude and direction in the winding;
   means for summing output signals from the hall detectors and providing a first signal which manifests the magnitude of the ripple associated with the difference between the current flow in and out of the motor;
   means responsive to the first signal and a reference level signal for providing a second signal indicating that a ripple magnitude exceeding a predetermined magnitude associated with the reference signal;
   means responsive to said second signal for providing a third signal if the second signal is still provided following a predetermined time delay interval independent of the frequency of the motor current;
   means responsive to said third signal for causing the motor to operate at a speed less than said first speed until the object is at a preestablished location and then stopping the motor.

2. Apparatus according to claim 1 characterized in that the motor control comprises:
   means for summing output signals from the hall detectors to provide a fourth signal that manifests the absolute magnitude of the difference between current flow in and out of the motor;
   means responsive to said fourth signal and a second reference signal for providing a fifth signal when the absolute magnitude of the difference in current flow in and out of the motor exceeds a preestablished level associated with the second reference signal;
   means responsive to said fifth signal for providing a sixth signal if, following a predetermined time delay independent of the frequency of the motor current, the fifth signal is still provided;
   means responsive to said sixth signal for causing the motor to stop.

* * * * *